FORMATION OF LIGHT SCATTERING IMAGES IN PHOTOCHROMIC LAYERS

Filed Oct. 1, 1965

INVENTORS
ALAN B. AMIDON
CARL BRYNKO
BY Ronald Zibelli
James J. Ralabate
ATTORNEYS United States Patent Office 3,450,533

Patented June 17, 1969

3,450,533

FORMATION OF LIGHT SCATTERING IMAGES IN PHOTOCHROMIC LAYERS

Alan B. Amidon, Penfield, and Carl Brynko, West Webster, N.Y., assignors to Xerox Corporation, Rochester, N.Y., a corporation of New York Filed Oct. 1, 1965, Ser. No. 491,966
Int. Cl. G03c 5/48, 3/00
U.S. Cl. 96—27 10 Claims

ABSTRACT OF THE DISCLOSURE

An image is formed by exposing an imaging member comprising a supersaturated solid solution of an organic photochromic material in a resin binder, the photochromic material having a polarity which changes with changes in its photochromic state upon exposure to actinic electromagnetic radiation, to a source of actinic radiation in image configuration thereby forming a latent image and developing the latent image with a solvent, either the resin or the solvent being polar and the other being non-polar.

This invention relates in general to a novel imaging system and, more specifically, to an imaging system employing light induced changes in the polarity of organic photochromic compounds to control their crystallization from saturated solutions in a softened binder.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecules upon exposure to light. This conversion may, for example, result in the isomerization of the molecule. The conversion of each molecule normally takes place at an extremely rapid speed but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher forms of a great many different photochromic compounds so as to make them suitable for use in practical imaging systems and, although some success has been achieved in slowing down the reconversion of the higher to the lower form of some photochromic compounds with various modifications of their substituents, no one has yet succeeded in permanently stabilizing these higher forms. Additional effort has been devoted to the problem of achieving maximum color change from the lower to the higher form of various photochromic compounds, but even had these goals been achieved the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenon of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging member and imaging method utilizing photochromic compounds in which the image generated by exposure of the compound serves only as a temporary, latent image which is developed and fixed to produce a permanent image that in no way depends upon the permanency of the higher form of the photochromic itself.

The above and still further objects of the present invention are accomplished, generally speaking, by providing a system in which an imaging layer of a resinous binder saturated with a photochromic compound is exposed to an image with actinic electromagnetic radiation. This exposure source may constitute a source of visible light, ultraviolet, X-ray or any other radiation source which is capable of converting the particular photochromic compound from one of its forms to the other. The photochromic compound is selected so that one of its forms is significantly more polar than the other and the original photochromic compound is deposited on the imaging member in saturated solution in a resin which is either strongly polar or non-polar depending upon whether a reversal or conventional image is desired and upon the characteristics of the photochromic compound. After imagewise conversion of at least a portion of the photochromic compound from one state to the other, the photochromic-binder layer is exposed to a solvent vapor opposite in polarity to that of the binder and because of the marked difference in the degree of polarity between the two states of the same photochromic compound, it will crystallize out of solution in the binder in either exposed or unexposed areas. If, for example, an originally non-polar photochromic compound is deposited in saturated solution in a polar resin binder to make the imaging layer and the photochromic is then rendered polar by conversion to the higher photochromic state in exposed areas, this converted material will become more soluble in the polar binder while the unexposed photochromic material retains its limited degree of solubility in the polar binder. Thus, when the imaging layer is exposed to a non-polar solvent vapor after exposure, the non-polar unexposed areas being less soluble in the polar binder will begin to crystallize out of the saturated solution forming a high resolution, light scattering crystalline image. By changing the nature of the binder from polar to non-polar and the solvent from non-polar to polar image reversal may be achieved using the same photochromic compound since in this instance the non-polar background areas will be more soluble in the binder than the exposed polar areas of the photochromic compound so that image areas which are more readily softened by the solvent will crystallize first.

In order that the invention will be more clearly understood, reference is now made to the accompanying drawings in which an embodiment of the invention is illustrated by way of example in which.

Figure 1:
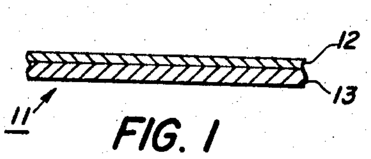
FIGURE 1 is a side sectional view of one imaging member made according to the invention.

Referring now to FIGURE 1 there is seen an exemplary imaging member generally designated 11 made up of a photochromic binder layer 12 on a supporting substrate 13. Any suitable substrate capable of imparting the desired mechanical strength to the imaging member may be employed. Typical materials which may be used include aluminum, copper, brass, steel, glass, polycarbonates, polyurethane, polyethers including crosslinked epoxy, and the like. In the event that a polymeric substrate is employed it will generally be desirable to select one which is not affected by the solvent used in the development step of the imaging process so that the structural integrity of the imaging member as a whole will not be affected during development.

The photochromic compound and resin may be blended and deposited on the supporting substrate by any suitable coating technique so long as the blend contains sufficient of the photochromic compound to form a supersaturated solid solution of the photochromic in the binder after coating is completed. One exemplary technique for carrying out this procedure is to dissolve the proper quantities of the binder and photochromic compound in one or more solvents and then coat the imaging layer from this solution by pour coating, dip coating, whirl coating or the like so that a supersaturated solid solution of the photochromic in the binder is formed upon drying. The thickness of the coating has not been found to be critical and may vary widely. Coatings from about 2 to about 10 microns have been imaged satisfactorily. Although it is preferable to use a resin which is strongly polar or non-polar so that it will contrast strongly with the change in polarity imparted to the photochromic compound by exposure, any suitable resin may be used. Typical resins include Staybelite Ester 10 and Pentalyn H, glycerol and pentaerythritol esters, respectively, of partially (50%) hydrogenated rosin sold by the Hercules Powder Co. of Wilmington, Del.; Velsicol EL–11, a terpolymer of styrene, indene and isoprene, marketed by the Velsicol Chemical Co. of Chicago, Ill.; polyalpha-methyl styrene; Piccolyte S–70 and S–100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 100, respectively); Piccodiene 2212 (a styrene-butadiene resin available from the same company); Piccolastic A–75, D–100 and E–100 (polystyrene resin with melting points of 75° C., 100° C. and 100° C. available from the same company); Neville R–21, R–9 and Nevillac Hard (cumarone-indene resins); Amberol ST137X (an unreactive, unmodified phenolformaldehyde resin available from Rohm & Hass); ethyl cellulose; ethyl hydroxy cellulose; nitrocellulose; ethyl acrylate polymer, methyl acrylate poymer; methy methacrylate polymer; Arcolor 1242 (a chlorinated polyphenyl); Pliolite AC (a styrene-acrylate copolymer); Pliolite VTAC (a vinyl toluene-acrylate copolymer); and Neolyn 23 (an alkyd resin available from Hercules Powder Co.) chlorinated rubber; paraffin wax; various soluble polyesters; polyvinyl chloride; polyvinylidene chloride; polyvinyl butyral; shellac; amine formaldehydes; polyvinyl acetals; silicones; phenoxies, and mixtures and copolymers thereof.

The percentages of photochromic compound in the imaging layer 13 may range widely depending on the resin with which it is used and the percentage at which it forms a saturated solution therein. This generally ranges from about 10 to 150% by weight of the resin. Any suitable photochromic compound whose polarity changes on photchromic conversion may be employed. Typical photochromic compounds include:

Spiropyrans such as 1,3,3-trimethyl-6′-nitro-8′-allyl-spiro (2′H-1′-benzopyran-2,2′-indoline);
1.3.3-trimethyl-5,6′-dinitro-spiro (2′H-1′-benzopyran-2,2′-indoline);
1,3,3-trimethyl-7′-nitro-spiro-(2′H-1′-benzopyran-2,2′-indoline);
3,-methyl-6-nitro-spiro-[2H-1-benzopyran-2,2′-(2′H-1′-beta-naphthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-7-methoxy-7′-chlorospiro (2′H-1′-benzopyran-2,2′-indoline);
1,3,3-trimethyl-5-chloro-5′-nitro-8′-methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-xantho-10,2′ (2′H-1′-benzobetanaphthopyran);
3,3′-dimethyl-6′-nitro-spiro (2′H-1′-benzopyran-2,2′-benzopyran-2,2′-benzothiazole);
3,3′-dimethyl-6′-nitro-spiro (2′H-1′-benzopyran 2,2′-benzo-oxazole);
1,3-trimethyl-6-nitro-spiro (2′H-1′-benzopyran-2,2′-indoline);
6′-nitro-1,3,3-trimethyl-indolinobenzopyrylospiran;
8′-allyl-1,3,3-trimethylindolinobenzopyrylospiran;
8′-carbomethoxy-1,3,3-trimethylindolinobenzopyrylospiran;
8′-methoxy-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′,8′-dibromo-1,3,3-trimethylindolinobenzopyrylospiran;
6′-chloro-8′-nitro-1,3,3-trimethylindolinobenzopyrylospiran;
5-nitro-6′-nitro-1,3,3-trimethylindolinobenzopyrylospiran;
6′-nitro-8′-fluoro-1,3,3-trimethylindolinobenzopyrylospiran;
6′-methoxy-8′-nitro-1,3,3-trimethylindolinobenzopyrylosprian;
5′-nitro-8′-methoxy-1,3,3-trimethylindolinobenzopyrylospiran;
6′-bromo-8′-nitro-1,3,3-trimethylindolinobenzopyrylospiran.

Anthrones such as bianthrone;
xanthylideneanthrone;
4,4′-methylanthrone;
4,4′-methoxy-bianthrone;
3-chloro-10-(9′-xanthylidene)-anthrone;
3-methyl-10-(9′-xanthylidene)-anthrone;
4′-chloro-10-(9′-xanthylidene)-anthrone; and
10′-9′-2′-methyl xanthylidene)-anthrone.

Sydnones such as

N-(3′-pyridyl)-sydnone;
N-benzylsydnone;

N-p-methylbenzyl-syndnone;
N-3, 4-dimethyl-benzylsydnone;
N-p-chlorobenzylsydnone;
N,N'-ethylenebissydnone; and
-N,N'-tetramethylenebis sydnone.

Anils such as salicylidene aniline;
5-bromo salicylidene-alpha-naphthylamine;
salicylidene-m-phenylenediamine;
salicylidene-m-phenylenediamine;
salicylidene-m-toluidene;
salicylidene 3,4-xylidene;
salicylidene-p-anisidine;
o-nitrobenzidene-p-aminobiphenyl;
o-nitrobenzidene-m-nitroaniline;
o-nitrobenzidene-p-phenetidine;
salicylidene-p-aminobenzoic acid;
p-hydroxy benzidene-p-bromoaniline;
p-hydroxy-benzidene 2,4-xylidine 2-hydroxy-3-methoxy-benzidene 2,5-xylidene; and
salicylidene-o-chloroaniline.

Hydrazones such as the 2,4-dinitro-phenylhydrozone of 5-nitro-salicylaldehyde;
benzaldehyde beta-naphthyl-hydrazone;
benzaldehyde anisylhydrazone;
benzaldehyde-m-chloro-phenylhydrazone, benzaldehyde-p-bromophenylhydrazone;
cinnamaldehyde phenylhydrazone;
cinnamaldehyde beta-naphthylhydrazone;
cinnamaldehyde m-tolyl-hydrazone;
cinnamaldehyde p-tolylhydrazone;
cinnamaldehyde 3,4-xylydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal-m-tolylhydrazone;
p-tolualdehyde phenylhydrazone;
vanillin beta-naphthylhydrazone.

Osazones such as benzil-beta-naphthyl-osazone;
benzil m-tolylosazone;
benzil 2,4-xylylosazone;
4,4'-dimethoxy benzil beta-naphthylosazone;
4,4'-dimethoxy benzil phenylosazone;
4,4'-dimethoxybenzil-2,4-xylylosazone;
3,4,3'4'-bis(methylenedioxy) benzil alpha-naphthylosazone;
3,4,3'4'-bis (methylene-dioxy) benzil 2,4-xylylosazone.

Semicarbazones such as chalcone semicarbazone;
chalcone phenyl semicarbazone;
2-nitrochalcone seimcarbazone;
3-nitrochalcone semicarbazone;
cinnamaldehyde semicarbazone;
cinnamaldehyde thiosemicarbazone;
o-methoxy cinnamaldehyde semi-carbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-p-penten-3-one-semicarbazone.

Stilbene derivatives such as 4,4'-diformamido-2,2'-stilbene disulfonic acid;
4,4'-diacetamido-2,2'-stilbene disulfonic acid and its sodium, potassium barium, strontium, calcium, magnesium and lead salts;
4,4'-bis(4-acetamidobenzoyleneamido)-2,2'-stilbene disulfonic acid;
4,4'-bis(p-(p-acetamido-benzamido)benzamido)-2,2'-stilbene disulfonic acid.

Fulgides (substituted succinic anhydrides) such as alpha-anisyl-gamma-phenyl fulgide;
alpha, gamma-dianisyl fulgide;
alpha, gamma-dicumyliso fulgide;
alpha, gamma-diphenyl fulgide;
alpha, gamma-distyryl fulgide;
alpha-piperonyl-gamma-phenyl fulgide;
tetraphenyl fulgide.

Amino-camphor compounds such as 3-(p-dimethyl aminophenylamino)-camphor and
3-(p-diethylaminophenylamino)-camphor.

Thio indigo dyes: o-nitrobenzyl derivatives such as 2-(2',4'-dinitro-benzyl) pyridine;
2,4,2'-trinitrodiphenylmethane;
2,4,2',4',2'',4''-hexanitro-triphenylmethane;
ethyl bis (2,4-dinitrophenyl) acetate;
2-(2'-nitro-4'-carboxybenzyl) pyridine;
3,3'-dinitro-4,4'-bis(2-pyridylmethyl)azoxybenzene; and,
4-(2'-nitro-4'-cyano-benzyl)pyridine.

The spiropyrans are, however, a preferred class of materials owing to their more sensitive imaging capabilites and the fact that they change from a non-polar to a very polar molecular configuration by ring opening upon exposure.

Figure 2:
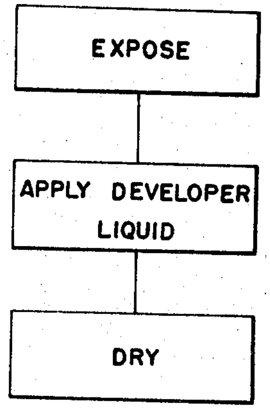
FIGURE 2 is a flow diagram of the process steps of the invention.

As shown in FIGURE 2, the basic steps involved in carrying out the process of this invention involve exposing the photoresponsive imaging member 11 to an imagewise pattern of actinic electromagnetic radiation, treating the exposed layer with a solvent vapor and drying the imaging member to make the image formed permanent. In exposing to the image to be reproduced, any source of electromagnetic radiation which is actinic to the photochromic material may be employed. In the case of most photochromic compounds in their lower or unexcited forms, an ultraviolet radiation source may be conveniently employed to exopse the material in image-wise configuration so as to convert exposed areas to the higher or excited form of the material, although light of this short wavelength is not always required. Since many photochromic materials in their higher or excited forms may be "triggered" or caused to revert to the lower unexcited form by exposure to visible light, a light source in the visible range (from about 4000–7500 angstrom units) may be conveniently employed for imagewise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited from, this technique may be conveniently employed for reversal imaging. The intensity of the exposure need not necessarily be strong enough to produce an intense color change in the photochromic compound since with most materials this requires a conversion of a gross amount of the photochromic from one form to the other, while to be operative in the process of this invention, only enough photochromic material must be converted so that a polarity differential will exist between exposed and unexposed areas. The term "photochromic" should be understood in this context as it is used throughout the specification and claims.

Once exposure is complete, the imaging member is exposed to the developing liquid. This developing liquid may consist of a polar or non-polar solvent, and any suitable solvent may be employed. Typical solvents include n-hexane;
2-methyl pentane;
3-methyl pentane;
2,2-dimethyl butane;
2,3-dimethyl butane;
n-heptane;
n-octane;
n-nonane;
n-decane;
n-undecane;
n-dodecane;
n-tridecane;
n-tetradecane;
n-pentadecane;
n-hexadecane;
kerosene;
gasoline;
mineral oil.

Cycloparaffins such as cyclopentane,
cyclohexane,
cycloheptane,
cyclooctane.

Halogenated solvents such as carbon tetrachloride,
tetrafluorotetrachloropropane,
chloroform,
methylene chloride,
trichloroethylene,
perchloroethylene,
chlorobenzene,
trichloromonofluoromethane,
tetrachlorodifluoroethane.

Trifluoroethane; amides such as formamide, ester such as ethylacetate,
isopropyl acetate,
butyl acetate,
amyl acetate,
cyclohexyl acetate,
isobutyl propionate,
butyl lactate.

Ethers such as diethyl ether,
diisopropyl ether,
dioxane,
tetrahydroduran,
ethylene glycol,
monoethyl ether;
ketones such as
acetone,
methylethyl ketone,
methylisobutyl ketone and cyclohexanone; alcohols such as methanol, ethanol, isopropyl alcohol, cyclohexanol, and benzyl alcohol; aromatics such as toluene, benzene, xylene, mesitylene, pyridine and mixture thereof.

In selecting the particular combination of photochromic composition, resin binder and developing solvent the sense of the image, that is to say whether or not a photographic reversal of the original is desired, should be kept in mind as well as whether or not the binder resin, developing solvent and excited and unexcited forms of the photochromic compound are polar or non-polar in nature. The sense of the image produced by exposure to the same original may be controlled by the selection of the binder, resin and developing solvent which are employed. Thus, for example, the use of a supersaturated solution of a photochromic compound, such as the spiropyran of Example I which is non-polar in its unexposed condition and polar after exposure, in a polar resin binder such as nitrocellulose, a polyamide, a polyacrylonitrile or the like, will produce crystallization in only unexposed areas when developed with a non-polar developing solvent such as xylene, hexane or trichlorotrifluoromethane. Crystallization of the non-polar unexposed photochromic moleclules occurs more readily because this form of the photochromic compound is much less soluble in the polar resin binder than the exposed polar form of the photochromic compound and further because the non-polar photochromic molecules tend to be softened and dissolved by the non-polar solvent allowing them to crystallize much more readily from the unstable solution than the polar form which is grossly less soluble in the non-polar solvent. Using the same photochromic compound with a non-polar resin such as polystyrene, polyethylene, polymethylmethacrylate or the like and a polar developing solvent such as methyl isoamyl ketone, cyclohexanone or furfural, the exposed polar areas of the photochromic will crystallize because they are less soluble in the non-polar resin than the non-polar unexposed areas and more readily softened by the polar solvent.

Figure 3:
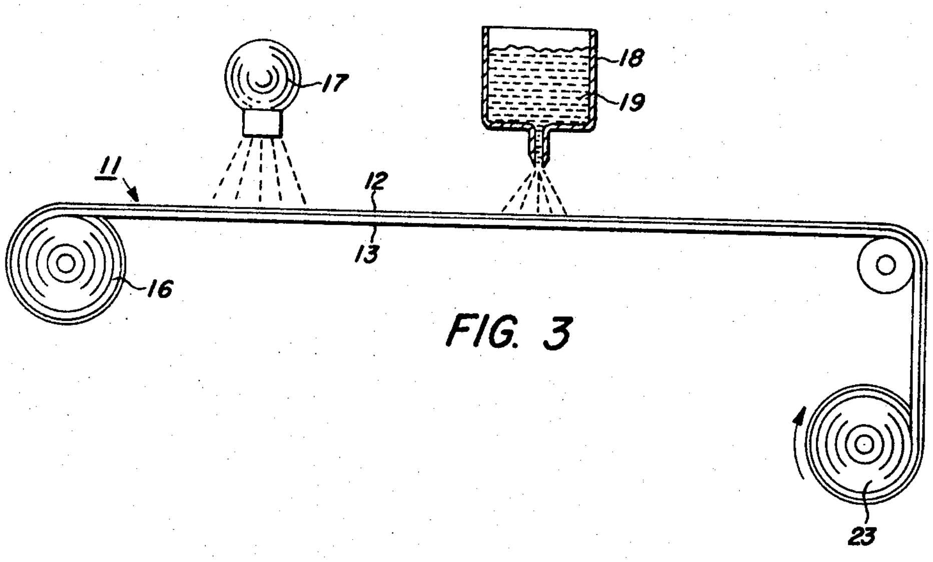
FIGURE 3 is a side sectional view of an illustrative embodiment of an apparatus adapted for imaging according to the invention.

In FIGURE 3, there is illustrated a simple exemplary apparatus for carrying out the imaging technique of the invention. In this apparatus, imaging web 11 consisting of photochromic imaging layer 12 and substrate 13 comes off a supply roll 16 and passes under a projector 17 which projects a pattern of light and shadow corresponding to the image to be reproduced with an actinic light source on the photochromic layer of the imaging web 11 through the overcoating so as to convert the photochromic material included therein from one photochromic state to another in image-wise configuration. Following exposure, imaging web 11 passes beneath a spray applicator 18 which deposits solvent uniformly over its surface. This solvent at least partially dissolves the imaging layer and causes the photochromic compound in the form which is least soluble in the binder to crystallize out of the supersaturated solid solution in which it existed in the binder. As explained supra, this occurs in either exposed or unexposed areas only because of the difference in polarity between only one of these areas and the binder. As the solvent evaporates off, crystallization takes place, forming a light scattering image. The developed image on imaging web 11 is then rewound on take-up roll 23 after the solvent dries off. The following illustrative examples of preferred embodiments of the invention are now given to enable those skilled in the art to more clearly understand and practice the invention described above. Unless otherwise indicated, all parts and percentages are taken by weight.

EXAMPLE I

Ten grams of 6-nitro - 1,3,3 - trimethylindolinobenzopyrylospiran and 8 grams of nitrocellulose are dissolved with four hours stirring in 40 grams of toluene and 50 grams of methyl isoamyl ketone followed by filtering to remove excess undissolved spiropyran. This solution is dip coated in the dark to a thickness of about 5 microns on an aluminum plate and air dried. The dried layer is then exposed to an image transparency with a 9-watt fluorescent light available from the Eastern Corporation of Westbury, N.Y., under the trade name "Blacklite" using a filter which passes about a 10 angstrom bandwidth centered on 3660 angstroms. After imagewise exposure, a maroon colored image is seen to form on the film which is then treated with xylene vapor. As the vapor penetrates, the ntirocellulose crystallization rapidly occurs in the unexposed areas of the imaging member forming a frosty looking permanent image pattern. This is believed to occur because the unexposed (non-polar) photochromic molecules are less soluble in the polar nitrocellulose binder than the polar exposed form of the photochromic and further because the non-polar xylene solvent tends to redissolve the non-polar unexposed photochromic more rapidly than it redissolves the polar exposed form.

EXAMPLE II

The procedure of Example I is repeated except that a non-polar polystyrene resin is used to replace the nitrocellulose resin of Example I and the non-polar xylene developing solvent is replaced with methyl isoamyl ketone resulting in the production of a photographic reversal of the FIGURE 1 image. That is to say, an image in which exposed areas are crystallized.

EXAMPLES III–IV

The procedures of Examples I and II are repeated except that hexane is substituted for xylene in the procedure of Example III and cyclohexanone is substituted for methyl isoamyl ketone in the procedure of Example IV, respectively, resulting in essentially the same results as those produced in Examples I and II.

EXAMPLES V–VI

In Examples V and VI, bianthrone and 9-xanthylidene anthrone are employed, respectively, and mixed with nitrocellulose binder according to the formula and procedure of Example I. In these two examples, the imaging procedure of Example I is followed except that the same filter is employed with a 100 watt light source for 20 minute exposure. The images formed in these examples are slightly lower in density as compared with the image of Example I.

EXAMPLE VII

The procedure of Example I is repeated exactly except that the coated film is first uniformly exposed to the 3660 angstrom unit light source until it achieves a deep maroon color. Following this exposure, a transparency to be reproduced is overlaid on the imaging layer and exposed to a source of yellow light for one hour which serves to bleach the excited colored form of the photochromic back to its unexcited colorless form in exposed areas. The solvent development step of Example I is then carried out resulting in a photographic reversal of the image produced according to the Example I procedure.

Although specific materials and conditions are set forth in the above examples, these are merely illustrative in the present invention. Various other materials, such as any of the typical photochromic and/or resins listed above which are suitable, may be substituted for the materials used in the examples with similar results. The materials of the invention may also have other materials mixed, dispersed, copolymerized or otherwise added thereto to enhance, sensitize, synergize or otherwise modify their properties. The developing solvent liquid may be applied by a number of different techniques, such as dipping, roll coating, spraying, pouring, etc. Many other modifications and/or additions to the process will readily occur to those skilled in the art upon reading this disclosure, and these are intended to be encompassed within the spirit and scope of the invention.

What is claimed is:

1. A photographic method for forming a light scattering image comprising exposing an imaging member comprising a supersaturated solid solution of an organic photochromic material in a resin binder, said photomaterial having a polarity which changes with changes in its photochromic state, to a pattern to be reproduced with an actinic electromagnetic radiation source of sufficient energy to convert at least a portion of the exposed material from one photochromic state to another thereby altering the solubility of said photochromic material in said binder to form a latent image and developing said latent image with a solvent, one of said resin and said solvent being polar and the other being non-polar whereby at least a portion of said photochromic material crystallizes out of solution in said binder in conformance to said latent image.

2. A method according to claim 1 in which said photochromic material is initially in its lower, unexcited state and in which said exposure step comprises exposing said imaging material to a pattern with an electromagnetic radiation source of sufficient energy to convert exposed areas thereof to the higher excited photochromic state.

3. A method according to claim 1 in which said photochromic material is initially in its higher, excited state and in which said exposure comprises exposing said photochromic material to a pattern of electromagnetic radiation of a wavelength capable of converting exposed areas thereof to the lower unexcited photochromic state.

4. A method according to claim 1 including using a polar resin.

5. A method according to claim 1 including using a non-polar resin.

6. A photographic method for forming a light scattering image comprising exposing an imaging member comprising a super-saturated solid solution of 1,3,3-trimethylindolinobenzopyrylospiran in a resin binder to a pattern to be reproduced with an actinic electromagnetic radiation source of sufficient energy to convert at least a portion of said exposed 1,3,3-trimethylindolinobenzopyrylospiran from one photochromic state to another thereby altering the solubility of said 1,3,3-trimethylindolinobenzopyrylospiran in said binder to form a latent image and developing said latent image with a solvent, one of said resin and said solvent being polar and the other being non-polar, whereby at least a portion of said 1,3,3-trimethylindolinobenzopyrylospiran crystallizes out of solution in said binder in conformance to said latent image.

7. A method according to claim 6 in which said photochromic material comprises 6′-nitro-1,3,3-trimethylindolinobenzopyrylospiran.

8. An imaging member comprising an imaging layer on a supporting substrate, said imaging layer comprising a super-saturated solid solution of an organic photochromic material in a resin binder, said photochromic material exhibiting a change in polarity with a change in its photochromic state sufficient to reduce the solubility of one photochromic state of said photochromic material in said binder.

9. An imaging member according to claim 8 in which said photochromic material comprises a photochromic 1,3,3-trimethylindolinobenzopyrylospiran.

10. A photographic method comprising exposing an imaging layer on a supporting substrate, said imaging layer comprising a supersatuated solid solution of an organic photochromic material in a resin binder, said photochromic material having a polarity which changes with changes in its photochromic state, to a pattern to be reproduced with an actinic electromagnetic radiation source of sufficient energy to convert at least a portion of the exposed material from one photochromic state to another thereby altering the solubility of said photochromic material in said binder to form a latent image, developing said latent image with a solvent, one of said resin and said solvent being polar and the other being non-polar whereby at least a portion of said photochromic material crystallizes out of solution in said binder in conformance to said latent image and removing said solvent from said imaging layer thereby forming a light scattering image in said binder.

References Cited

UNITED STATES PATENTS 3,346,385 10/1967 Foris ---------------- 96—36

NORMAN G. TORCHIN, *Primary Examiner.*

J. R. EVERETT, *Assistant Examiner.*

U.S. Cl. X.R.

96—35, 90